US012278100B2

(12) United States Patent
Pengemann et al.

(10) Patent No.: US 12,278,100 B2
(45) Date of Patent: Apr. 15, 2025

(54) HOLDING DEVICE FOR AT LEAST ONE FILAMENT AND MASS SPECTROMETER

(71) Applicant: Leybold GmbH, Cologne (DE)

(72) Inventors: Niklas Pengemann, Wuppertal (DE); Yessica Brachthaeuser, Cologne (DE); Thorsten Benter, Haan (DE)

(73) Assignee: Leybold GmbH, Cologne (DE)

( * ) Notice: Subject to any disclaimer, the term of this patent is extended or adjusted under 35 U.S.C. 154(b) by 407 days.

(21) Appl. No.: 17/785,728

(22) PCT Filed: Dec. 16, 2020

(86) PCT No.: PCT/EP2020/086566
§ 371 (c)(1),
(2) Date: Jun. 15, 2022

(87) PCT Pub. No.: WO2021/122842
PCT Pub. Date: Jun. 24, 2021

(65) Prior Publication Data

US 2023/0084351 A1 Mar. 16, 2023

(30) Foreign Application Priority Data

Dec. 18, 2019 (DE) ..................... 10 2019 219 991.7

(51) Int. Cl.
*H01K 1/18* (2006.01)
*H01J 49/08* (2006.01)
*H01J 49/14* (2006.01)

(52) U.S. Cl.
CPC ................ *H01K 1/18* (2013.01); *H01J 49/08* (2013.01); *H01J 49/147* (2013.01)

(58) Field of Classification Search
CPC ........... H01K 1/18; H01J 49/08; H01J 49/147
(Continued)

(56) References Cited

U.S. PATENT DOCUMENTS 2,703,843 A * 3/1955 Cameron ................ H01J 49/14 250/288
5,497,006 A 3/1996 Sferlazzo et al.
(Continued)

FOREIGN PATENT DOCUMENTS

CA 102129949 A 7/2011
CN 102129949 A 7/2011
(Continued)

OTHER PUBLICATIONS

Taiwanese Office Action dated Jun. 12, 2024 and translated Taiwanese Search Report dated Jun. 7, 2024, 8 pages.
(Continued)

*Primary Examiner* — Nicole M Ippolito
(74) *Attorney, Agent, or Firm* — Theodore M. Magee; Westman, Champlin & Koehler, P.A.

(57) ABSTRACT

The invention relates to a holding device for at least one filament, comprising: at least one filament receptacle for receiving the at least one filament. The holding device is designed for the detachable attachment, in particular clamping attachment, of the at least one filament receptacle to a container of an ionization device. The invention also relates to a mass spectrometer comprising: an ionization device having a container in which an ionization space for ionizing a gas is formed, at least one holding device which is designed for the detachable attachment, in particular clamping attachment, of the at least one filament receptacle to the container, and a vacuum housing to which the holding device, in particular a base body of the holding device, is detachably connected.

17 Claims, 3 Drawing Sheets

(58) Field of Classification Search
USPC .......................................... 250/281, 282, 283
See application file for complete search history.

(56) References Cited

U.S. PATENT DOCUMENTS

| | | | |
|---|---|---|---|
| 2012/0280122 | A1 | 11/2012 | Nakajima et al. |
| 2019/0066967 | A1 | 2/2019 | Kao et al. |
| 2022/0005682 | A1 | 1/2022 | Chung et al. |

FOREIGN PATENT DOCUMENTS

| | | | |
|---|---|---|---|
| CN | 103426705 | A | 12/2013 |
| GB | 792042 | | 3/1958 |
| JP | S592521 | Y2 | 1/1984 |
| JP | S5954163 | A | 3/1984 |
| JP | S60020443 | | 2/1985 |
| JP | H06176724 | A | 6/1994 |
| JP | H09219169 | | 8/1997 |
| WO | 2019229445 | A1 | 12/2019 |
| WO | 2020244889 | A1 | 5/2020 |

OTHER PUBLICATIONS

German Office Action dated Dec. 18, 2019 for corresponding German application Serial No. 10 2019 219 991.7, 9 pages.
PCT Notification of Transmittal of the International Search Report and the Written Opinion of the International Searching Authority, or the Declaration dated Mar. 31, 2021 and International Search Reports dated Mar. 31, 2021 for corresponding PCT application Serial No. PCT/EP2020/086566, 5 pages.
PCT Written Opinion of the International Searching Authority dated Mar. 31, 2021 for corresponding PCT application Serial No. PCT/EP2020/086566, 8 pages.
Japanese Notification of Reason for Rejection dated Aug. 15, 2024 for corresponding Japanese application Serial No. 2022-537490, 8 pages.
Chinese First Office Action dated Oct. 31, 2024 for corresponding Chinese application Serial No. 2020800877695, 11 pages.

* cited by examiner

HOLDING DEVICE FOR AT LEAST ONE FILAMENT AND MASS SPECTROMETER

CROSS-REFERENCE OF RELATED APPLICATION

This application is a Section 371 National Stage Application of International Application No. PCT/EP2020/086566, filed Dec. 16, 2020, which is incorporated by reference in its entirety and published as WO 2021/122842 A1 on Jun. 24, 2021, the content of which is hereby incorporated by reference in its entirety and which claims priority of German Application No. 10 2019 219 991.7, filed Dec. 18, 2019.

BACKGROUND

The invention relates to a holding device for at least one filament, comprising: at least one filament receptacle for receiving (and for holding) the at least one filament, and a mass spectrometer having at least one such holding device.

Filaments (grow wires) are used in ionization devices to ionize gases, which can be used, for example, in mass spectrometers for trace analysis. In electron ionization, the filament (glow wire) is heated to high temperatures in order to generate an electron beam through the thermoelectric effect, which hits the gas to be ionized and ionizes it.

For the filament replacement in such an electron ionization device, it is typically necessary to remove the entire ionization device (i.e., the inlet or the inlet system, a container having the ionization volume and the extraction optics) from the mass spectrometer in order to be able to subsequently replace the filament(s). This process is very time-consuming and requires breaking the vacuum. However, in specific applications of mass spectroscopy, for example in process monitoring, the high expenditure of time during the filament replacement is difficult to tolerate.

The discussion above is merely provided for general background information and is not intended to be used as an aid in determining the scope of the claimed subject matter. The claimed subject matter is not limited to implementations that solve any or all disadvantages noted in the background.

SUMMARY

According to the invention, it is proposed that the holding device or the filament receptacle for the at least one filament be mechanically decoupled from the container of the ionization device in which the ionization space is formed. The filament(s) is/are thus not mounted directly on the container or on the ionization device, but rather placed on or attached to separate filament receptacles which in turn are detachably fastened to the container. Each filament receptacle typically has only one filament, which is positioned (clamped) on the container in a predetermined installation position. The filament receptacle(s) is/are typically clamped to the container for detachable attachment, i.e., the holding device is designed to apply a clamping force to the filament receptacle(s) in the installation position in order to press it/them against the container.

In the installation position, the filament receptacle abuts on the container or on the housing of the ionization device. In order to prevent the filament receptacle from slipping in the installation position, the filament receptacle can have one or more projections which, in the installation position, engage in one or more recesses, for example in the form of grooves, on the container of the ionization device, or the other way around.

In one embodiment, the holding device comprises a base body which is connected to the at least one filament receptacle via at least one connecting element. The base body is typically designed for detachable fastening to a (vacuum) housing of the mass spectrometer to allow access to the filament receptacle(s) during the filament replacement by detaching the base body or the entire holding device from the housing of the mass spectrometer.

The base body can have a flange portion or form a flange which is typically aligned orthogonally to a main or central axis of the container or the ionization device and which is flanged, typically screwed, to a housing of the mass spectrometer. Through the opening in the housing that becomes free when the base body is removed, the at least one filament receptacle, which is connected to the base body via the connecting element, can also be removed from the ionization device. If the base body is mounted in a predetermined installation position on the housing of the mass spectrometer, e.g., flanged or screwed, the filament receptacle is also held in a predetermined installation position relative to the container with the aid of the connecting element and is thus clearly positioned relative to the container. In particular, the connecting element can serve to generate a clamping or pressing force on the filament receptacle arranged in the holding position or to transmit it to the filament receptacle.

In one development, the connecting element is designed as a resilient element, in particular as a leaf spring. In this case, the connecting element itself is used to apply the clamping force to the at least one filament receptacle, since the connecting element is deflected from its basic position in the installation position and exerts a force on the filament receptacle.

In an alternative development, the connecting element is designed so as to be rigid and a pretensioning element engages the connecting element in order to apply a clamping force to the filament receptacle. In this case, the connecting element itself does not serve to apply a clamping force to the filament receptacle, but rather to transmit the clamping force which is transmitted from the (mechanical) pretensioning element to the rigid connecting element.

In a further development, the base body has a linear guide for guiding the connecting element, which can form a sliding feed-through, for example. The connecting element can be displaced along the linear guide relative to the base body. In this case, the connecting element and thus the filament receptacle are held in the installation position against the action of a pretensioning force, the pretensioning force typically acting parallel to the direction along which the connecting element can be displaced. When inserting the holding device into the mass spectrometer, the connecting element is typically displaced from a basic position in which the pretensioning element does not exert any pretensioning force on the connecting element, against the effect of the pretensioning force when the filament receptacle comes into abutment with the container. In this way, in the installed state of the holding device, i.e. after the base body of the holding device has been fixed to the housing of the mass spectrometer, the pretensioning element exerts a clamping force on the filament receptacle. For the detachable clamping of the filament receptacle on the container, the holding device can also have a sliding feed-through instead of a linear guide.

In an alternative embodiment, the connecting element forms a pivotable arm which is connected to the base body via a rotary joint. When inserting the holding device into the vacuum housing, the connecting element is typically pivoted or deflected from a basic position about the axis of rotation against the effect of a pretensioning force as soon as the filament receptacle comes into abutment with the container. In the installation position, i.e., after the base body of the holding device has been fixed on the vacuum housing, the filament receptacle is pressed against the effect of the pretensioning force against the container. The pivotable arm can in particular form a two-sided lever, on the first lever arm of which the filament receptacle is rigidly fastened. The pretensioning element typically acts on the second lever arm.

In a further development, the pretensioning element is designed as a spring element which is preferably connected on the one hand to the base body and on the other hand to the connecting element. For the case described above in which the base body has a linear guide for the connecting element, the spring element can be a compression spring, for example. In this case, when introducing the holding device into the ionization device, the filament receptacle is displaced together with the connecting element against the action of the compression spring, so that the filament receptacle exerts a clamping force on the container in its installation position. For the case described above that the filament receptacle is attached to a connecting element in the form of a pivotable arm that serves as a bilateral lever, the spring element can be connected at one end to the second lever arm and at the other end to the base body.

The holding device preferably has two connecting elements in the form of pivotable arms which are each connected to the base body via a rotary joint. In this case, a separate filament receptacle is fastened to each of the two pivotable arms. This embodiment is particularly advantageous in the event that two (or possibly more than two) filament receptacles are detachably attached or fastened to opposite sides of the container and are to be clamped. The use of two separate rotary joints and the attachment of the two pivotable arms to the same base body has proven to be beneficial for applying a clamping force, as will be described in more detail below.

In a further development, the pretensioning element is designed to pivot the two pivotable arms in opposite directions, i.e., with opposite directions of rotation, about each rotary joint, in order to fasten the two filament receptacles attached to the pivotable arms on two opposite sides of the container in a clamping manner. For this purpose, the pretensioning element typically acts on the two first lever arms of the pivotable arms or on the two second lever arms of the pivotable arms in order to pivot them towards or away from one another. In order to pivot the two pivotable arms in the manner of a pair of pliers (symmetrically) relative to the container, the pretensioning element engages into a respective (first or second) lever arm of the pivotable arms at the same distance from the respective axis of rotation. The holding device, more precisely the connecting elements and the filament receptacles, can in particular be arranged mirror-symmetrically to a plane of symmetry or to an axis of symmetry. The plane of symmetry or the axis of symmetry intersects the central axis of the container.

The advantage of the (symmetrical) clamping of the container from two sides is that in this way shear forces which could displace the main axis of the container are prevented. Since the container or the ionization device does not have to be removed for the filament replacement, the optimized positioning of the main axis of the container is retained in this way. An inlet or an inlet opening for supplying the gas to be ionized into an ionization space and an outlet for the ionized gas are typically formed along the main axis of the container. The container is typically substantially radially symmetrical to the main axis, i.e., it has a cylindrical basic shape, the cylinder axis of which forms the main axis of the container.

In a further embodiment, the pretensioning element is designed so as to be rigid, in particular rod-shaped, is guided in a guide track, in particular in a linear guide, of the base body, and has a free end with an abutment surface for abutment with the container. In this case, the pretensioning element is moved along the guide track when introducing the holding device into the housing, as soon as the abutment surface is brought into abutment with the container. The movement along the guide track has the effect that the pretensioning element acts on the connecting element in order to transmit a clamping force to the connecting element. It has proven to be advantageous if the pretensioning element is guided in a linear guide in this case so as to be linearly displaceable. The direction of displacement of the pretensioning element is preferably oriented perpendicular to the center axis of the container.

In a further development, the pretensioning element has a guide element which engages the two pivotable arms. As a rule, the entire pretensioning element is moved along the guide track in this case and the guide element, for example in the form of a bolt, pin, or the like, is coupled to a respective lever arm of the two pivotable arms in order to pivot them about the respective axis of rotation and to apply a clamping force to the filament receptacle(s) or to the container in the installation position of the holding device. The coupling of the guide element to the two pivotable arms can be implemented, for example, by means of elongated holes or the like made in the first or second lever arms of the pivotable arms. It goes without saying that the guide element can also be coupled to the pivotable arms in another way.

Another aspect of the invention relates to a mass spectrometer, comprising: an ionization device with a container in which an ionization space for ionizing a gas is formed, at least one holding device, which is designed as described above, for detachable, in particular clamping, fastening of the at least one filament receptacle on the container, as well as a vacuum housing with which the holding device, in particular the base body of the holding device, is detachably connected. The base body of the holding device typically has a flange portion and, in its installation position, is detachably connected to the vacuum housing, for example via a screw connection. The holding device or its base body is thus accessible to an operator who is located outside the vacuum housing in order to allow the filament or filaments to be exchanged.

In the event that the holding device has two (or possibly more) filament receptacles for holding two (or possibly more) filaments, the ionization device can be operated redundantly: A filament replacement or a removal of the holding device is only necessary if both filaments have failed. The mass spectrometer can, however, also have two or more holding devices which are fastened to the vacuum housing via separate base bodies or flanges which, for example, are each arranged orthogonally to one another or opposite one another in relation to the container. In this case, a respective holding device can be released from the vacuum housing as soon as one of the filaments has failed. In this case, however, at least two separate accesses or openings are required in the vacuum housing to ensure redundancy.

Through the access or the opening in the vacuum housing, the holding device can be removed from the vacuum housing together with the filament receptacle(s) and the filament can be replaced, without the container or the ionization device as a whole having to be removed from the vacuum housing and repositioned in the vacuum housing after the filament exchange. This is particularly advantageous in the event that the ionization device or its container/housing is connected directly to ion-transferring components, for example transfer quadrupoles or the like, or is even screwed onto them.

When the holding device is removed from the vacuum housing, the vacuum must be broken. In order to ensure a quick filament replacement, the vacuum housing should be vented with an inert gas, e.g., with (dry) nitrogen or with noble gases. In this way, the pumping time after the filament replacement can be reduced, since the pumping out of water, which is deposited on the inner walls of the vacuum apparatus during other ventilation, is the most time-consuming step of the entire pumping process.

In one embodiment of the mass spectrometer, the rigidly designed pretensioning element of the holding device rests with its abutment surface on the container in the installation position. As was further described in connection with the holding device acting in the manner of pliers, the pretensioning element is in this case brought into abutment with the container when inserting the holding device into the vacuum housing and presses the two filament receptacles fastened to the pivotable arms—in relation to a main axis of the container—on opposite sides of the container or clamps them to the container. To achieve this, the flange portion of the base body is typically oriented orthogonally to the main or central axis of the container or the ionization device.

Further features and advantages of the invention emerge from the following description of embodiments of the invention, with reference to the figures of the drawing which show details which are substantial to the invention, and from the claims. The individual features can each be implemented individually or collectively in any combination in a variant of the invention.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Embodiments are shown in the schematic drawing and are explained in the following description. In the drawing.

DETAILED DESCRIPTION

In the following description of the drawings, identical reference signs are used for identical or functionally identical components.

Figure 1:
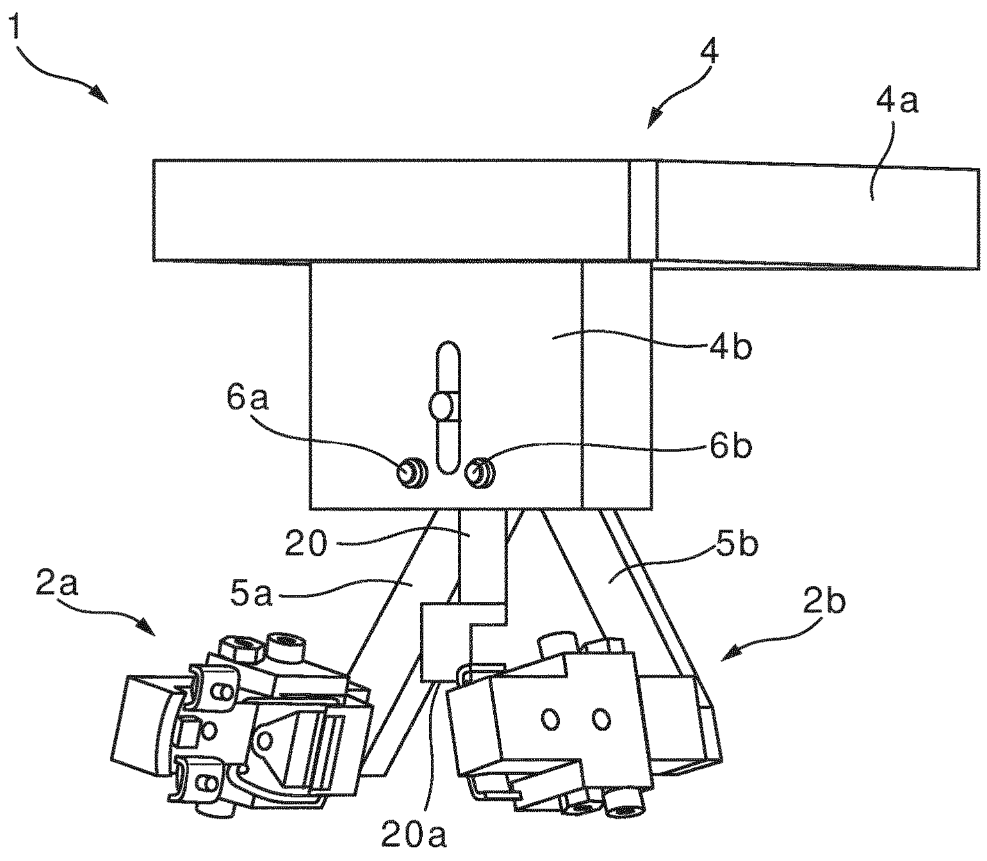
FIG. 1 is a schematic representation of a holding device which has two filament receptacles.

FIG. 1 schematically shows a holding device 1 which comprises two filament receptacles 2*a,b* for receiving (and for holding) a respective filament 3*a,b* (cf. FIG. 2), which is not depicted in FIG. 1. The first and second filament receptacles 2*a,b* are connected to a base body 4 of the holding device 1 via a first and second connecting element 5*a,b* in each case. In the example shown in FIG. 1, the two connecting elements are each designed in the form of a rigid, pivotable arm 5*a,b*. The pivotable arms 5*a, b* are each connected to the base body 4 via their own rotary joint 6*a,b*.

Figure 2:
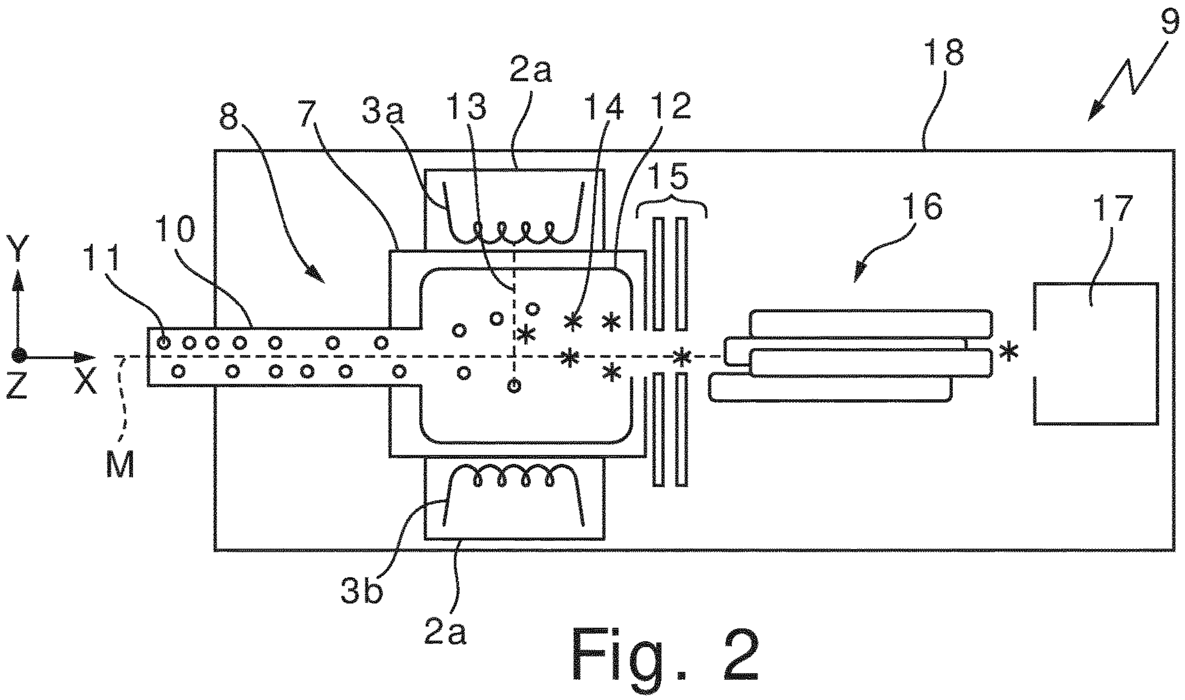
FIG. 2 is a schematic representation of a mass spectrometer which has the holding device of FIG. 1 for the clamping attachment or fastening of two filament receptacles on a container of an ionization device.

FIG. 2 shows the two filament receptacles 2*a,b* in an installation position of the holding device 1 in a mass spectrometer 9. As can be seen in FIG. 2, in the installation position of the holding device 1, the two filament receptacles 2*a,b* rest on two opposite sides of a container 7 of an ionization device 8 which forms part of the mass spectrometer 9. When installing the holding device 1, the two filament receptacles 2*a,b* are attached or fastened to the container 7 in a clamping manner due to a pliers movement of the two pivotable arms 5*a,b*.

In the example shown, the container 7 has a substantially cylindrical outer surface with which the filament receptacles 2*a,b* are brought into abutment, the pivotable arms 5*a,b* exerting a clamping force on the filament receptacles 2*a,b*, as described in more detail below in connection with FIG. 3*a-c*.

The ionization device 8 of the mass spectrometer 9 shown in FIG. 2 has an inlet or an inlet system 10 for feeding a gas 11 to be analyzed into an ionization space 12 which is formed in the container 7 of the ionization device 8. As can also be seen in FIG. 2, the first filament 3*a* generates an electron beam 13 which is fed to the ionization space 12 via a side opening in the container 7 and serves to generate an ionized gas 14 to be analyzed by electron impact ionization.

The mass spectrometer 9 also has an extraction device 15 in the form of an electrode arrangement, in order to extract the ionized gas 12 from the ionization space 10 and to accelerate it in the direction of a transfer quadrupole 16 and, if necessary, to focus it, before this is analyzed by mass spectrometry in a detector 17, for example in the form of a time-of-flight detector. In addition to transporting the ionized gas 14, the transfer quadrupole 16 can also serve for mass separation or for mass selection. It goes without saying that the mass spectrometer 9 shown in FIG. 2 is to be understood as an example and can also be designed in other ways. For example, the mass spectrometer 9 can have other types of detectors 17, another type of ion transfer device, etc.

The mass spectrometer 9 shown in FIG. 2 also has a vacuum housing 18 in the form of a stainless steel housing, in which the ionization device 8 and the container 7 are fixed. The ionization device 8 or the container 7 can in particular be screwed to other components of the mass spectrometer 9, for example to the extraction device 15 or to the transfer quadrupole 16. The components or stages within the vacuum housing 18 are pumped differentially by means of a vacuum pump (not shown). The interior of the vacuum housing 18 of the mass spectrometer 9 is not readily accessible to an operator from the outside.

In order to nevertheless allow the filaments 3*a,b* to be exchanged quickly, the base body 4 of the holding device 1 is fastened, typically screwed, in its installation position in the mass spectrometer 1 to the vacuum housing 18 of the mass spectrometer 9 via a detachable connection. In the example shown, a plate-shaped portion 4*a* of the base body 4 is positioned on the outside of the vacuum housing 18 and flanged to it or screwed to it. A portion 4*b* of the base body 4 protruding beyond the plate-shaped portion 4*a* extends into the vacuum housing 18 of the mass spectrometer 9 in the installation position of the holding device 1.

For the exchange of the two filaments 3*a,b* in the mass spectrometer 9 shown in FIG. 2, it is therefore not necessary to remove the ionization device 8, in particular the container 7, from the vacuum housing 18 of the mass spectrometer 9; rather, it is sufficient if the externally accessible portion 4*a* of the base body 4 is detached from the vacuum housing 18 and the holding device 1 is removed from the vacuum housing 18, the clamping of the two filament receptacles 2*a, b* being released.

For the exchange of the filaments 2*a,b*, it is necessary to break the vacuum in the vacuum housing 18. In order to avoid that moisture is deposited on the components located in the vacuum housing 18 or on the inside of the vacuum housing 18, the interior of the vacuum housing 18 is vented with an inert gas, for example with (dry) nitrogen or purged with an inert gas. In this way, the pumping time during the subsequent renewed evacuation of the vacuum housing 18 can be significantly reduced.

In order to reposition the holding device 1 in the vacuum housing 18 after the exchange of the filaments 2*a,b*, the protruding portion 4*a* of the base body 4 is introduced, together with the filament receptacles 2*a* which are connected to the base body 4 via the two pivotable arms 5*a,b*, into the vacuum housing 18 along the Z direction of an XYZ coordinate system shown in FIG. 2, specifically via an access or via an opening in the vacuum housing 18, which is located in the Z direction above a main axis or central axis M of the ionization device 8. In the mass spectrometer 9 shown in FIG. 2, the plate-shaped portion 4*a* of the base body 4 therefore runs parallel to the XY plane, which corresponds to the plane of the drawing.

Figure 3A:
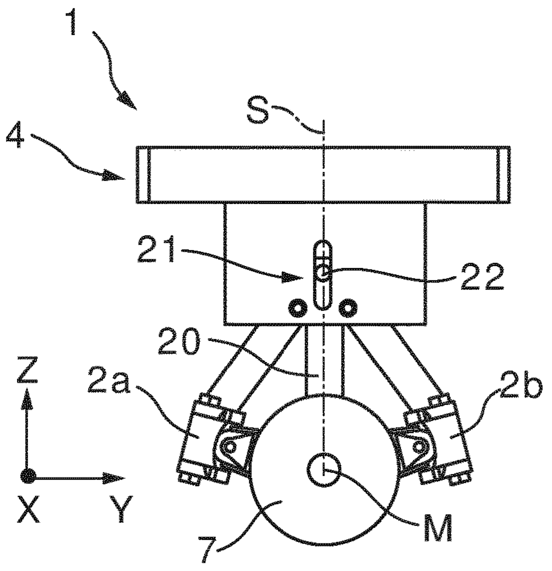
FIG. 3*a-c* are schematic representations of the holding device of FIG. 1 and of the container to which the two filament receptacles are fastened in a clamping manner.
Figure 3B:
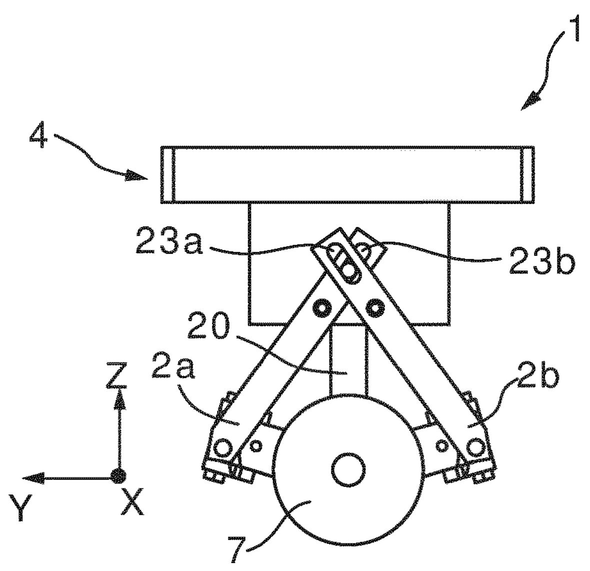
Figure 3C:
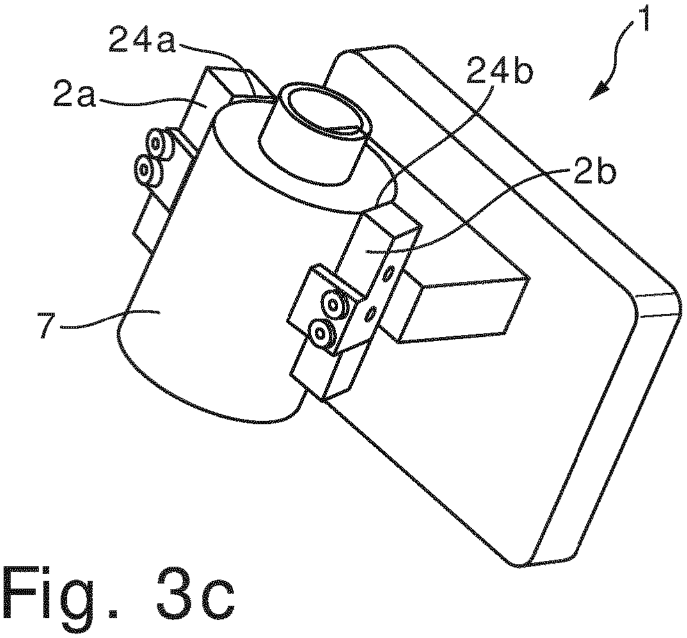

In order to press the two filament receptacles 2*a,b* against the outer surface or the circumference of the container 7, so that they are fixed or clamped in a predetermined position relative to the container 7, the holding device 1 shown in FIG. 1 and in FIG. 3*a-c* has a rigidly designed, rod-shaped pretensioning element 20. The rod-shaped pretensioning element 20 extends along an axis of symmetry S of the holding device 1 which runs perpendicular to the plate-shaped portion 4*a* of the base body 4 and which corresponds to the Z direction in the installation position of the holding device 1 in the vacuum housing 18.

The rod-shaped pretensioning element 20 has an abutment surface 20*a* (cf. FIG. 1) which is pressed against the container 7, more precisely against its outer surface, when inserting the holding device 1 into the vacuum housing 18. The rod-shaped pretensioning element 20 is displaced in a linear guide 21 (a rail) formed in the protruding portion 4*b* of the base body 4 along the axis of symmetry S, which corresponds to the Z direction in the installation position of the holding device 1. During the linear displacement of the pretensioning element 20 in the Z direction, a guide element 22 (in the example shown, a bolt) attached to the pretensioning element 20, which protrudes laterally over an elongated hole in the protruding portion 4*a* of the base body 4, is displaced in the direction of the plate-shaped portion 4*a* of the base body 4.

The guide element 22 in the form of the protruding bolt engages the two pivotable arms 5*a,b*, more precisely, the guide element 22 in the form of the bolt engages in two elongated holes 23*a,b* of a respective first lever arm of the two pivotable arms 5*a,b*, which are designed as double-armed levers in the example shown. The linear movement of the pretensioning element 20 and thus of the guide element 22 is converted in this way into an opposing pivoting movement of the two pivotable arms 5*a,b*, so that they are moved in opposite directions in the manner of pliers and exert a clamping force in the installation position of the holding device 1 on the two filament receptacles 2*a,b*, which, in the installation position, abut on the two opposite sides of the container 7, as shown in FIG. 2. The distance between the guide element 22 of the rod-shaped pretensioning element 20 and the free end of the pretensioning element 20 on which the abutment surface 20*a* is formed is matched to the length of the pivotable arms 5*a,b*, such that the filament receptacles 2*a,b* in the installation position can be brought laterally into abutment with the container 7 and a—not too great—clamping force is exerted on the filament receptacles 2*a,b*.

As can be seen in FIG. 3*c*, the filament receptacles 2*a,b* each have a concave (spherically) curved abutment surface 24*a*, 24*b*, which is formed on a projection of the filament receptacles 2*a,b* protruding in the direction of the container 7. In the installation position, the projection of the respective filament receptacle 2*a,b* engages in an annular groove (not shown) on the outer surface of the container 7. In the installation position, the spherically curved abutment surface 24*a*, 24*b* rests on the likewise spherically curved bottom of the annular circumferential groove which is formed on a disc-shaped, circular base plate of the container 7. The engagement of the projection of the filament receptacle 2*a,b* in the groove on the container 7 forms a lateral guide and prevents the respective filament receptacle 2*a,b* from executing an undesired movement in the direction of the central axis M of the container 7 in the installation position.

The container 7 is only designed to be cylindrical to simplify the representation, but can basically have any geometry. In particular, it is not necessary for the container 7 to have a continuous, circumferential outer surface which has only two openings for the passage of a respective electron beam 13. In the simplest case, the container 7 is formed from two end plates which are connected to one another via spacers. In this case, or in general, the ionization space 12 can form its own (optionally heatable) container which is arranged within the container 7 to which the filament receptacles 2*a,b* are fastened in a clamping manner. In this case, the respective filament receptacle 2*a,b* is brought into abutment with its abutment surface 24*a*, 24*b*, for example in a groove on the circumference of one or possibly both end plates and clamped by the pliers mechanism described above in the installation position of the holding device 1.

In the case of the holding device 1 shown in FIG. 1 and in FIG. 3*a-c*, the two filament receptacles 2*a,b* are clamped on opposite sides of the container 7, the clamping being carried out symmetrically to the axis of symmetry S of the holding device 1, which extends perpendicular to the central axis M of the container 7 and intersects the central axis M of the container 7. In this way, shear forces can be avoided which could otherwise displace the central axis M of the container 7 when applying the clamping force. Since the ionization device 8 and thus the container 7 do not have to be removed for the filament replacement, the optimized positioning or alignment of the container 7 is retained when the filament is changed.

The holding device 1 shown in FIG. 1 and FIG. 3*a-c* is typically only removed from the mass spectrometer 9 when both filaments 3*a,b* are defective and have to be replaced. A single functional filament 3*a*, 3*b* is sufficient for the operation of the ionization device 8; i.e., when the ionization device 8 is in operation, typically only one filament 3*a,b* is heated by means of a resistance heater known per se (not shown), in order to generate an electron beam 13.

Figure 4A:
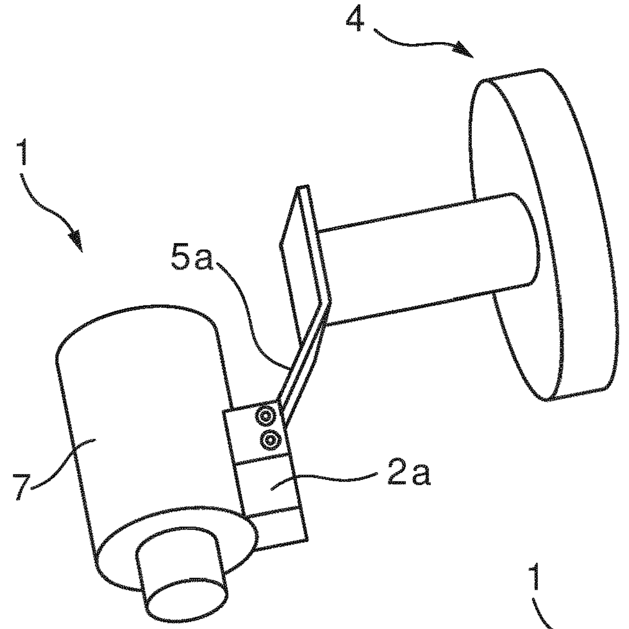
FIG. 4*a-c* are schematic representations of holding devices which are designed for the clamping attachment of a filament receptacle to the container.
Figure 4B:
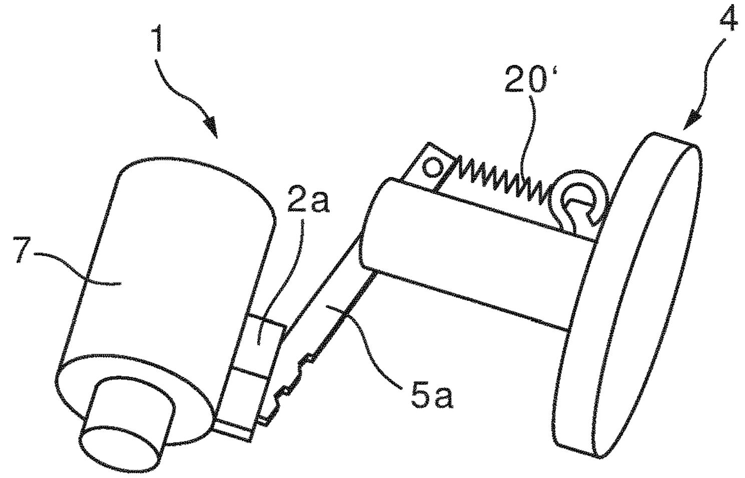
Figure 4C:
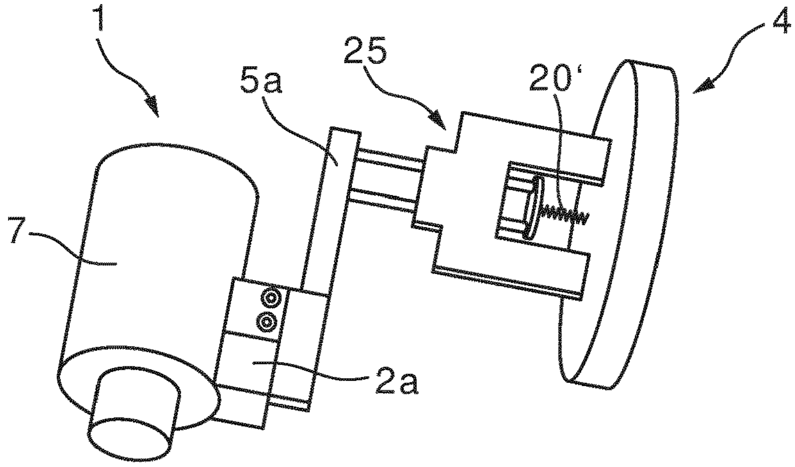

While the holding device 1 shown in FIG. 1 and in FIG. 3_a-c_ is designed to hold two filaments 3_a,b_ on a common base body 4, FIG. 4_a-c_ show three holding devices 1, each designed for holding only one single filament 3_a_ on a filament receptacle 2_a_. In the event that two filaments 3_a,b_ are to be detachably fastened to the container 7, the mass spectrometer 9 can have two holding devices 1 which are designed as in FIG. 4_a-c_. The base bodies 4 of the two holding devices 1 can be attached to two separate openings or accesses in the vacuum housing 18, which are generally opposite one another in order to avoid the occurrence of shear forces (see above).

The holding device 1 shown in FIG. 4_a_ has a connecting element for connecting the base body 4 to the filament receptacle 2_a_, which is designed as a resilient element, more precisely as a leaf spring 5_a_. In the installation position of the holding device 1, the leaf spring 5_a_ presses the filament receptacle 2_a_ against the container 7 in order to clamp the filament receptacle 2_a_ onto the container 7.

The holding device 1 shown in FIG. 4_b_, like the holding device 1 shown in FIG. 1, has a connecting element in the form of a pivotable arm 5_a_, which is connected to the base body 4 via a rotary joint. The pivotable arm 5_a_ forms a double-armed lever, on one lever arm of which the filament receptacle 2_a_ is rigidly fastened and on the other lever arm a pretensioning element 20' in the form of a tension spring engages, which generates a clamping force for pressing the filament receptacle 2_a_ against the container 7.

In the holding device 1 shown in FIG. 4_c_, the base body 4 has a linear guide 25, more precisely a sliding feed-through, for the rigidly designed connecting element 5_a_, which is displaced relative to the base body 4 against the force of a pretensioning element 20' in the form of a resilient element, in order to exert a clamping force on the filament receptacle 2_a_ in the installation position of the holding device 1 and to clamp it detachably to the container 7.

The holding devices 1 described above make it possible to exchange the filaments 3_a,b_ without having to remove the ionization device 8 or the container 7 from the vacuum housing 18 of the mass spectrometer 1 for this purpose. On the one hand, this accelerates the exchange of the filaments 3_a,b_ significantly and, on the other hand, avoids the need to reposition or align the container 7 or the ionization device 8 when reinserting them into the vacuum housing 18 after the filaments 3_a,b_ have been exchanged. It goes without saying that the holding devices 1 shown in FIG. 4_a-c_ can also be used in mass spectrometers 9 or in ionization devices 8 which have only one filament 3_a_.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A holding device for at least one filament, comprising:
at least one filament receptacle for receiving the at least one filament, characterized in that the holding device is designed for a detachable attachment of the at least one filament receptacle to a container of an ionization device; and
a base body which is connected to the at least one filament receptacle via at least one connecting element, wherein the connecting element is rigid and a pretensioning element engages into the connecting element in order to apply a clamping force to the filament receptacle.

2. The holding device according to claim 1, wherein the base body has a linear guide for guiding the connecting element.

3. The holding device according to claim 1, wherein the connecting element forms a pivotable arm which is connected to the base body via a rotary joint.

4. The holding device according to claim 3, which has two connecting elements in the form of pivotable arms which are each connected to the base body via a rotary joint.

5. The holding device according to claim 4, wherein the pretensioning element is designed to pivot the two pivotable arms in opposite directions about each rotary joint, in order to fasten the two filament receptacles attached to the pivotable arms on two opposite sides of the container in a clamping manner.

6. The holding device according to claim 4, wherein the pretensioning element has a guide element which engages on the two pivotable arms.

7. The holding device according to claim 1, wherein the pretensioning element is designed as a spring element which is preferably connected on the one hand to the base body and on the other hand to the connecting element.

8. The holding device according to claim 1, wherein the pretensioning element is rigid and is guided in a guide track, of the base body, and in which the pretensioning element has a free end with an abutment surface for abutment with the container.

9. The holding device of claim 8 wherein the pretensioning element is rod shaped.

10. The holding device of claim 8 wherein the guide track is a linear guide.

11. A mass spectrometer comprising:
an ionization device having a container in which an ionization space for ionizing a gas is formed, at least one holding device according to claim 1 and
a vacuum housing to which the holding device is detachably connected.

12. The mass spectrometer according to claim 11, wherein the rigidly designed pretensioning element of the holding device abuts with an abutment surface on the container.

13. The mass spectrometer of claim 11 wherein the base body is attached to the vacuum housing.

14. The holding device of claim 1 wherein the detachable attachment is a clamping attachment.

15. A holding device for at least one filament, comprising:
at least one filament receptacle for receiving the at least one filament, characterized in that the holding device is designed for the detachable attachment of the at least one filament receptacle to a container of an ionization device;
a base body which is connected to the at least one filament receptacle via at least one connecting element, wherein the connecting element is designed as a resilient element.

16. The holding device of claim 15 wherein the detachable attachment is a clamping attachment.

17. The holding device of claim 15 wherein the connecting element is a leaf spring.

* * * * *